T. C. SUZZI.
PEANUT BLANCHING MACHINE.
APPLICATION FILED JAN. 7, 1918.

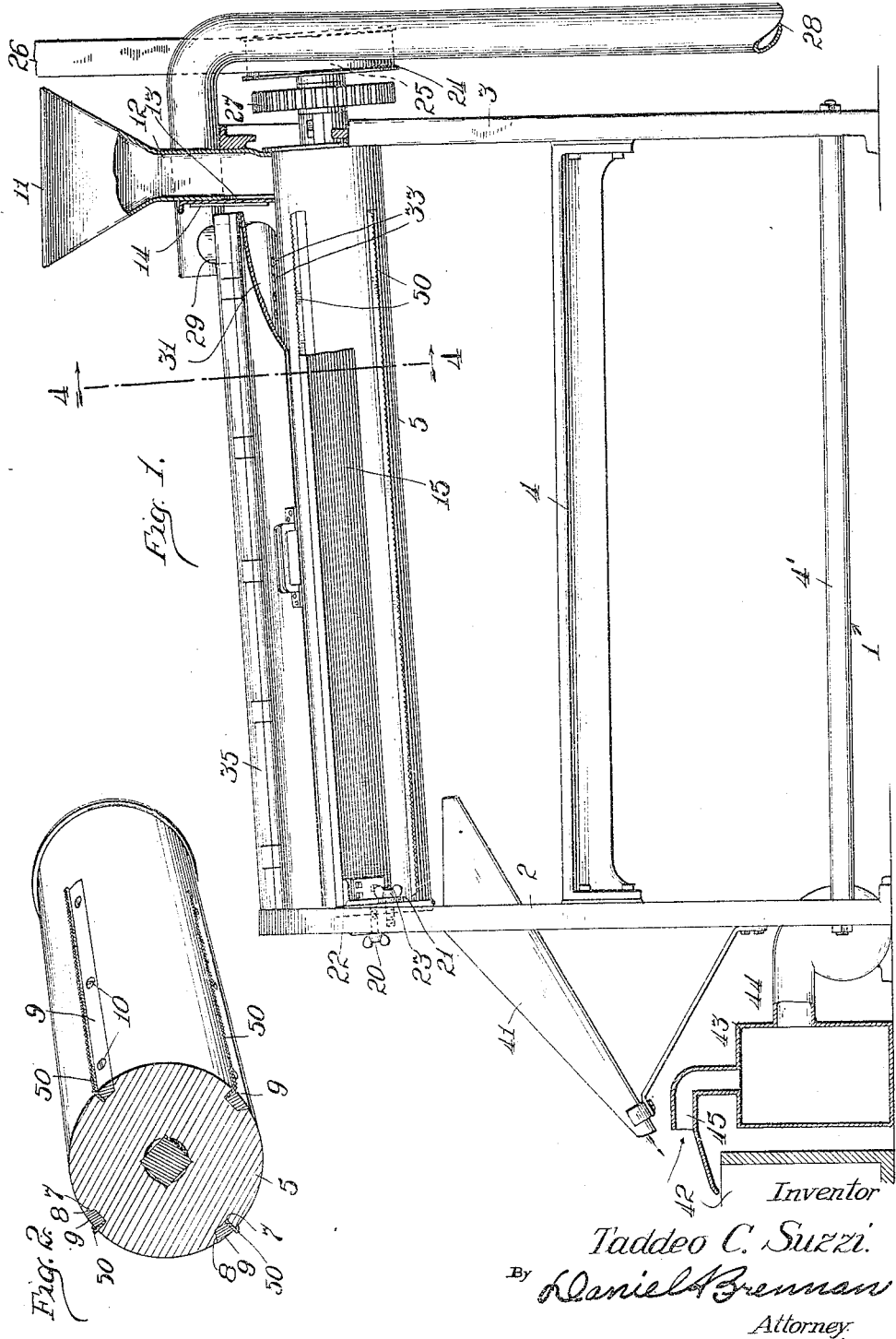

1,282,312.

Patented Oct. 22, 1918.
2 SHEETS—SHEET 2.

Inventor
Taddeo C. Suzzi
By Daniel A Brennan
Attorney

UNITED STATES PATENT OFFICE.

TADDEO C. SUZZI, OF CHICAGO, ILLINOIS.

PEANUT-BLANCHING MACHINE.

1,282,312.  Specification of Letters Patent.  Patented Oct. 22, 1918.

Application filed January 7, 1918. Serial No. 210,722.

*To all whom it may concern:*

Be it known that I, TADDEO C. SUZZI, a citizen of the United States, residing at Chicago, county of Cook, and State of Illinois, have invented certain new and useful Improvements in Peanut-Blanching Machines, of which the following is a specification.

The invention relates to a peanut blanching machine and its principal object consists in the provision of a machine of this character, whereby the membranes covering the kernel of the peanut are effectively removed without injury to the kernel.

The invention comprises a trough having a canted member at one side and a rotatable member at the other side, the canted member maintaining the peanuts in contact with the rotatable member, which is provided with means for cutting and removing the membranes.

It is an object of the invention to provide a cylindrical member with longitudinally extending ribs provided with serrated edges against which the peanuts are held so that the membranes are effectively destroyed.

A further object embraces the provision of a cylindrical member having a plurality of grooves extending in longitudinal or axial direction in which hacksaw blades are received which engage with their serrated edges peanuts held thereagainst.

Other objects include the provision of means for separating the membranes from the kernels, the prevention of ejectment of the kernels due to the rotation of the cylindrical member, the provision of driving means whereby uniform and contiguous rotation of the member is obtained, and the provision of suction means for withdrawing the membranes and splits prior to the discharge of the kernels into a receiving container.

To the accomplishment of the objects stated and others that will become apparent upon perusal of the specification, a preferred embodiment of the invention, which is merely indicative of the principle thereof, is described in the following specification, particularly pointed out in the claims forming part thereof and illustrated in the accompanying drawing; in which—

Figure 1 is a side view of the machine constructed in accordance with my invention with parts thereof shown in section;

Fig. 2 is a perspective view of the rotatable member having the means for destroying the membranes of the peanuts;

Figure 3:
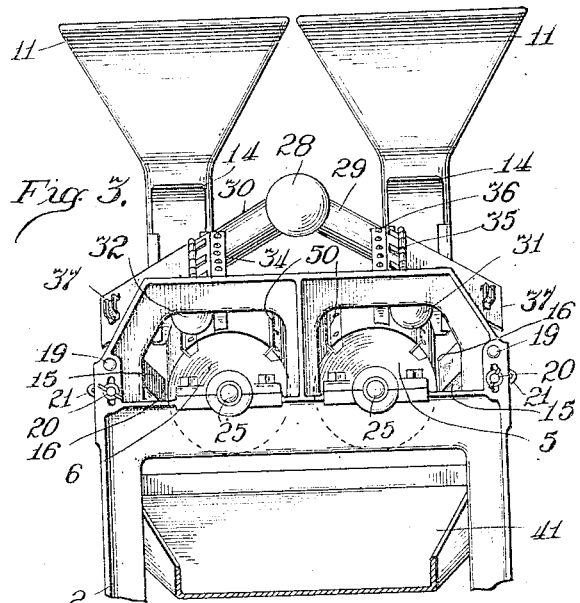
Fig. 3 is an end view of the device.

Referring to the drawing, 1 generally designates a frame which comprises vertical end members 2, 3 interconnected by longitudinal members 4 and 4', whereby the end plates are maintained in spaced relation, the whole constituting a rigid frame. The end plates form standards or bearings for the rotatable members 5 and 6, which, as is indicated particularly in Fig. 2, are each equipped with longitudinal grooves 7 extending the major part of the length of the members 5 and 6. In the embodiment shown four grooves are provided arranged at equal distance on the periphery of the cylindrical members and each groove is provided at one side with a slanting wall 8 and a filler 9, substantially of the same configuration as the groove 7 inserted therein, and when in operative position forms a complement and has its upward face conterminous with the periphery of the member 5 or 6. The radial wall of the groove, however, is not contacted by the contiguous side of the filler 9, but a space is provided there for the reception of a hacksaw blade 50, the serrated edge of which projects a short distance beyond the periphery of the cylindrical member 5 or 6. A plurality of screws 10 serve to maintain the filler within the groove and as will be readily seen the parts are so proportioned that a wedge effect is exerted on the blade to hold the latter in secured position in the groove.

Figure 4:
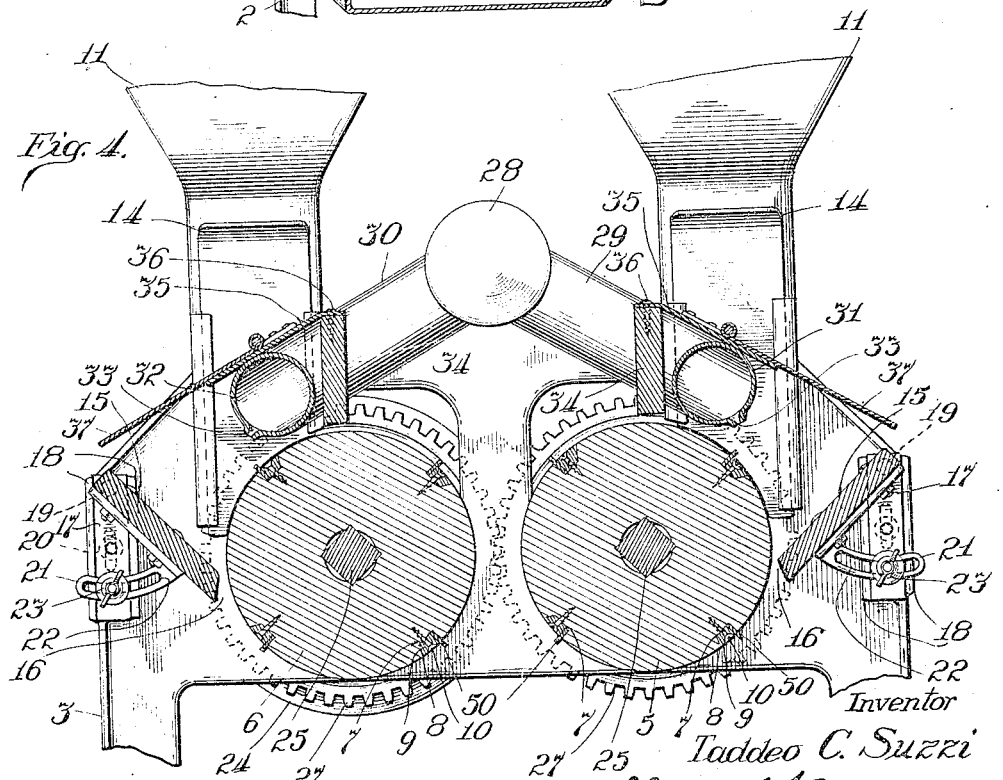
Fig. 4 is a transverse section, the section being taken on line 4—4 of Fig. 1.

As has been previously stated, the grooves do not extend the entire length of the roller but stop short of the forward end thereof to provide a smooth or plain portion thereof for a purpose readily understood. As will be seen by reference to Figs. 1–4 a plurality of hoppers 11 are provided each in registry with an appertaining cylinder or drum and having a spout 12 integral therewith, which delivers the peanuts onto the plain portion of the cylinder so that the former by gravity and due to the rotation of the cylinder are brought into contact with the hacksaw blades where disintegration of the membranes and blanching of the kernels are effected. An opening 13 is provided in the spout 12 and a gate valve 14 controls said opening, whereby the rate of feed may be regulated and if desired entirely stopped. Contiguous to the cylinder a longitudinal plate 15 is arranged in slanting position but maintains a small distance at the lower end thereof to provide an open space 16 which forms a slot for the ejectment of the membranes and split kernels. The plate 15 together with the cylindrical member 5 constitutes a trough into which the peanuts fall by gravity for the purpose of being blanched.

The cylinder or drum 6 is constructed with the same appurtenances and operates in identical manner as the drum 5 so that the description of one of these elements suffices to explain the operation of the machine. The plate 15 is pivotally secured by a pin 19 at its upper ends to a plate 17 having vertical movement in guides 18 arranged at the end walls 2 and 3 of the frame 1. A wing nut 20 permits adjustment of the plate 17 and therefore of the canted plate 15 in vertical direction, so that the space 16 maintained between the lower end of the plate 15 and the drum 5 may be increased or decreased as required. The plate 15 is also equipped with an arcuate bracket 21 in which a concentric slot 22 is provided for the reception of a wing nut 23, whereby the slanting position of the plate 15 may be varied within relatively wide limits.

The cylindrical members 5 and 6 derive their rotative power from a pulley 24 which is mounted on the extended shaft 25 of the drum 5 and is provided with flanges so as to prevent shifting and disengagement of the belt 26, which is trained around a drive shaft (not shown). The provision of the flanges on the pulley 24 is necessary in view of the fact that the rear end of the drum is lower than the forward end and hence the pulley 24 is provided in canted position. Drive to the rollers 6 is transmitted by gears 27, one of which only is indicated in Fig. 1.

The rotation of the drums 5 and 6 takes place in such direction that the peripheries thereof move upwardly, that is, the drum 5 moves in counterclockwise and drum 6 moves in clockwise direction, whereby the peanuts issued from the spout 12 are subjected to the tendency of being raised. This action on the part of the rollers would cause an upward throw of the peanuts whereby the latter could be split and disintegrated and in order to overcome this, air pressure is interposed acting opposite to the direction of rotation of that portion which constitutes the side wall of the peanut receiving trough.

A pipe 28 connected to a blower or other source of compressed air is extended above and centrally of the drums 5 and 6 and is equipped with branch pipes 29 and 30 each of which are connected to a longitudinal pipe 31 and 32 respectively having a plurality of openings 33 for the egress. As will be seen by reference to Fig. 4, the air emanating from the opening 33 acts on the peanuts to retain the same in the lower portion of the trough thus effectively counteracting the tendency of the roller 5 to lift the peanuts. The same, of course, applies as regards the rollers 6 and the air pipe 32. It has been found, however, that even with the provision of the air pressure in single instances kernels were raised by the rotation of the rollers and in order to avoid the ejectment of the kernels a guard plate 34 is provided which acts as an abutment and retainer for such kernels which in spite of the air pressure are carried upwardly by the rotation of the drum and forced into contact with the plate 34. The latter is provided with a cover plate 35 secured thereto by means of screws 36 and to this cover plate a second plate 37 is hingedly connected, constituting a cover for the trough and also preventing ejectment of kernels. The cover maintains at its outer end a distance from the upper edge of plate 15 to provide a longitudinal slot wherethrough membranes and split kernels may be discharged by the air pressure set up on the trough. Upon entry of the kernels into the trough the inclined position of the roller together with the air pressure prevailing will cause a longitudinal movement of the kernels therein, whereby they are subjected to the action of the serrated edges of the hacksaw blades 50, which cut or tear the membranes. The latter under the action of the air pressure are partly ejected through the opening space 16 but part of the membranes are carried along with the kernels and are separated prior to being received in a container, as will be presently described.

As previously stated, the rear end of the drums 5 and 6 is lower than the forward end so that a downwardly sloping trough is provided, whereby the kernels in conjunction with the serrated edges of the hacksaw blades arrange themselves at the lower portion of the trough and finally fall into a hopper 41, which is common to both drums 5 and 6. The hopper 41 discharges into a container 42, fragmentarily shown in Fig. 1, and in the path of the discharged kernels from the hopper to the container, a device is interposed setting up negative pressure so as to effect a complete separation of the membranes from the kernels, whereby the container 42 receives only the blanched kernels, whence the kernels may be removed for further treatment and packing. As is indicated in Fig. 1, an auxiliary reservoir 43 is arranged which is connected by a pipe 44 to a source of negative pressure or suction and a pipe 45 leads into the path of the discharged product to remove in the passage thereof the membranes and the split kernels, care being taken that the suction should be sufficient only to withdraw the membranes but not the solid kernels.

The drawings indicate by way of example one preferred embodiment of the invention but various modifications and alterations suggest themselves to those skilled in the art, and for this reason I do not limit myself to the exact structural features as shown but rather want to avail myself of all changes constituting departures within the scope of the invention as indicated in the appended claims.

I claim:

1. A peanut blanching machine, including a rotatable cylinder having longitudinal grooves, saw blades arranged in said grooves and projecting beyond the periphery of said cylinder, means for securing said blades in said grooves, and a stationary plate coacting with said cylinder to form a trough therewith and to maintain peanuts in light contact with said saw blades.

2. A peanut blanching machine, including a rotatable cylinder having longitudinally extending ribs with serrated edges, an inclined plane supporting surface extending substantially parallel to the axis of said cylinder and having its lower edge disposed contiguous to the cylinder surface, there being a free space between said lower edge and said cylinder through which slits are adapted to pass.

3. A peanut blanching machine, including a rotatable cylinder having longitudinal grooves, saw blades mounted therein and projecting beyond the periphery of said cylinder, a plate coöperating with said cylinder to provide a trough for the reception of peanuts, a fluid pressure means coacting with said plate for maintaining said peanuts within the trough against the action of said cylinder.

In testimony whereof I affix my signature in the presence of two witnesses.

TADDEO C. SUZZI.

Witnesses:
DANIEL O. BRENNAN,
MYRTIE KELLOGG.

Copies of this patent may be obtained for five cents each, by addressing the "Commissioner of Patents, Washington, D. C."